Nov. 4, 1924.          1,514,149
C. FRIZZELL
DEVICE FOR APPLYING BRAKE LININGS
Filed July 7, 1923
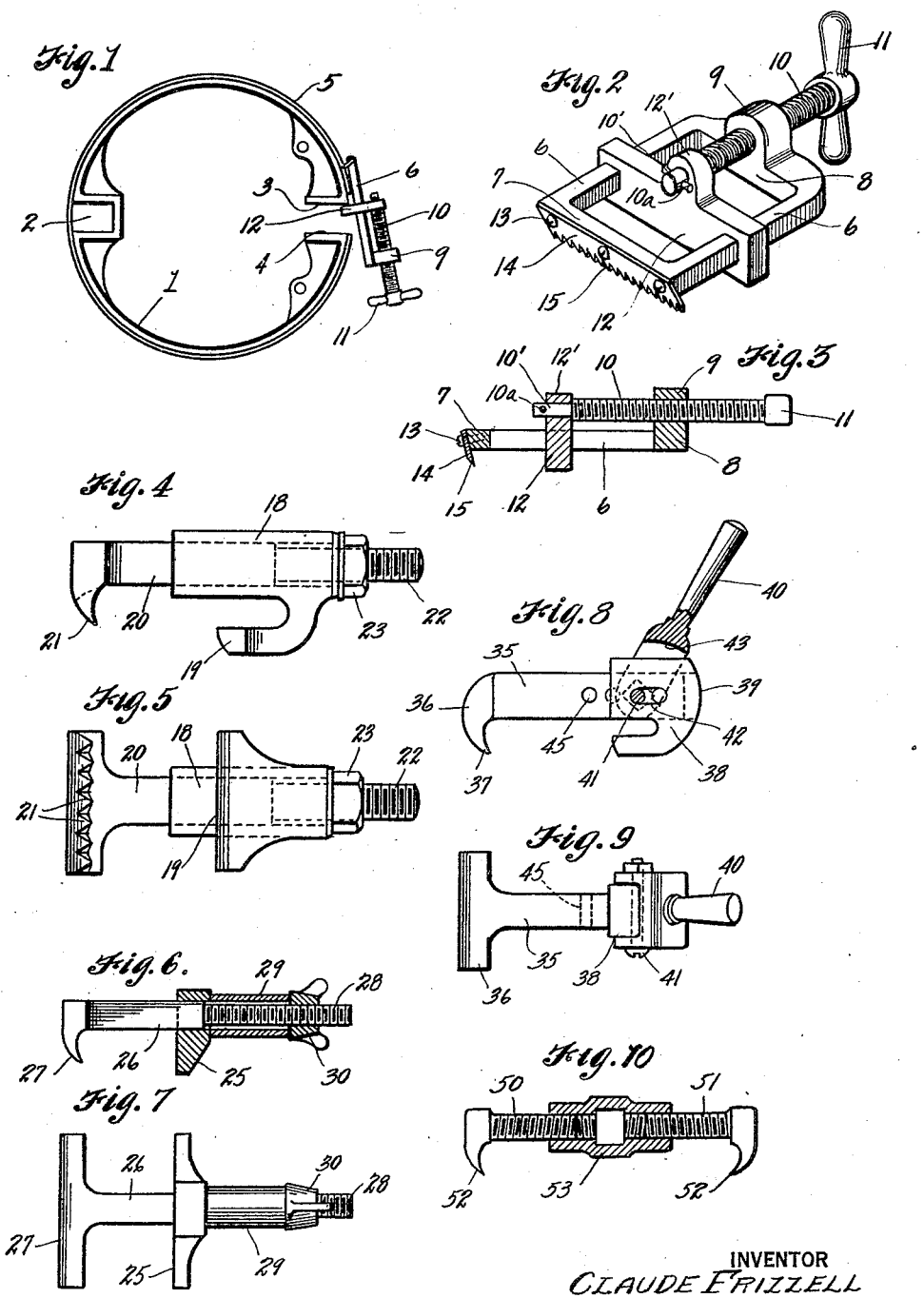
INVENTOR
CLAUDE FRIZZELL
BY
Richard J. Oaks
ATTORNEY Patented Nov. 4, 1924.

1,514,149

UNITED STATES PATENT OFFICE.

CLAUDE FRIZZELL, OF SEATTLE, WASHINGTON.

DEVICE FOR APPLYING BRAKE LININGS.

Application filed July 7, 1923. Serial No. 650,037.

*To all whom it may concern:*

Be it known that I, CLAUDE FRIZZELL, a citizen of the United States, and a resident of the city of Seattle, county of King, State of Washington, have invented certain new and useful Improvements in Devices for Applying Brake Linings, of which the following is a specification.

This invention relates to devices for applying lining to brake bands, and more particularly to devices whereby a strip of lining may be stretched tight about a brake band and thus held while being secured thereto, the present application being a supplement to my application for device for applying brake lining, filed July 27, 1922, under Serial No. 577,975.

The principal object of the present invention is to provide a device of the above character that will make possible the applying of a brake lining to a band in one operation and by one person.

Another object is to provide a device for the above purpose that will hold a lining strip tight and properly in position and will not interfere with the securing of the same to the brake band while it is being held.

A further object is to provide a device for applying brake lining that is of simple and durable construction, effective and efficient in operation and of relatively small cost.

Other objects reside in the various details of construction and combination of parts embodied in the invention.

In accomplishing these and other objects, I have provided the improved details of construction, the preferred forms of which are illustrated in the accompanying drawings, wherein—

Figure 1 is a view, in side elevation, illustrating the application of a lining applying device to a common type of brake band.

Figure 2 is a perspective view of the device in its preferred form of construction.

Figure 3 is a sectional view of the same, taken parallel with the screw.

Figure 4 is a side view of a device of an alternative form.

Figure 5 is an under side view of the same.

Figure 6 is a longitudinal section of another alternative form of construction.

Figure 7 is an underside view of the same.

Figure 8 is a side view of another type, partly in section, wherein an eccentric lever is used to effect the tightening operation.

Figure 9 is a top view of the device shown in Figure 8.

Figure 10 is a longitudinal, sectional view of another alternative device of the turnbuckle type.

Referring more in detail to the drawings—

1 designates a brake band which may be of the ordinary expanding type provided at one side with a recess 2 adapted to receive a band supporting member, and at its opposite side has spaced apart ends forming abutments 3 and 4 between which the band expanding member (not shown) may be located. Drawn about the band is a strip of brake lining 5 which, when being applied by means of the device as shown in Figure 1, would first be secured to the band at the end adjacent the abutment 4, and after being tightened, would be secured at its opposite end.

The brake band applying device, illustrated in Figures 1, 2 and 3 consists of a substantially rectangular open frame comprising parallel opposite side members 6—6 and forward and rearward end members 7 and 8; the latter being provided centrally with an upstanding bearing 9 through which a screw 10 is threaded to extend parallel with the side members of the frame. At its rearward end the screw has a handle 11 fixed thereon whereby it may be rotated, and at its forward end the screw has a reduced end 10' that is rotatably fixed by a pin 10ª within a smooth bearing 12' formed upon an abutment engaging plate 12 that extends transversely of the frame with its opposite ends slidable upon the opposite side members 6—6 of the frame.

The outer face of the cross member 7 of the frame is beveled inwardly, and secured thereto by means of screws 13 is a plate 14 provided with downwardly extending teeth 15 that are adapted, when the device is in use, to grip the lining for the tightening operation.

In using the device for applying a strip of brake lining to the band, one end of the lining 5 is secured by rivets, or other means, to the band adjacent the abutments 4, it is then drawn about the band and the teeth of plate 14 are imbedded in its opposite end with the plate 12 engaging with the end of band adjacent abutment 3. Then by turning screw 10, in proper direction, by means of the handle 11, the lining 5 will be tightened about the band. Its free end may then be riveted to the band through the open frame of the device, without releasing the holding tension thereon.

In Figures 4 and 5, I have illustrated a slightly modified construction comprising an abutment holding member 18 with a downwardly and forwardly extending abutment arm 19. In the member 18 a bar 20 is slidably mounted which has gripping teeth 21 at its outer end and a threaded shank 22 at its inner end whereon a nut 23 is threaded. This device is used in a like manner as is the device above described by seating the abutment arm 19 against abutment 3 of the band and embodying the teeth 22 in the lining strip. Then by tightening the nut, the strip will be drawn tight.

A somewhat similar device is illustrated in Figures 6 and 7 wherein 25 designates an abutment member through which a shank 26 is slidably extended. This shank has holding teeth 27 at its outer end and an elongated, threaded inner end 28. A sleeve 29 encloses this threaded end, and is seated at one end against the abutment 25. A wing nut 30 is threaded onto the end 28 against sleeve 29 and when tightened will draw the toothed portion toward the abutment. This device is used in like manner as the devices previously described.

Figures 8 and 9 illustrate another alternative type of construction wherein 35 designates a bar provided at its outer end with a cross head 36 with gripping teeth 37 formed along its under side. The inner end of the bar is slidable in an abutment 38 provided with a radially curved end 39. A lever 40 is pivotally mounted about the abutment 38 by means of a bolt 41 extended through the parts and through a longitudinally extended slot 42 in the abutment. The lever has a surface 43, eccentric to the surface 39 and adapted to ride upon the same when the lever is moved downwardly so that the abutment and toothed cross bar will be drawn together. A series of holes 45 are provided in the bar 35 so that a desired adjustment may be obtained.

Figure 10 illustrates a device comprising right and left hand threaded shanks 50 and 51 provided with gripping teeth 52 at their ends; the shanks being threaded into a turnbuckle 53. In using this device, the teeth 52 are embedded in the opposite ends of the lining strip and the strip drawn tight by turning the buckle 53.

It is readily apparent that any of the devices illustrated could be easily and quickly applied and by their use, a lining strip could be tightened and held while being secured.

The device illustrated in Figures 1, 2 and 3 provides easy access to the end of the strip, while it is being secured and permits the operation to be easily and quickly done by one person. Such devices can be made in various sizes and in different forms, at a relatively small cost.

Having thus described my invention, what I claim as new therein and desire to secure by Letters Patent, is:

1. A device of the character described comprising an open frame, lining gripping teeth at one end of the frame, a threaded bearing at the opposite end of the frame, a transverse abutment engaging plate slidable within the frame and a screw extended through the said bearing and having a rotatable connection with the said plate and operable to adjust the frame relative to the abutment plate.

2. A device of the class described comprising an open rectangular frame, a plate secured to the forward end of the frame having teeth thereon for holding engagement with a lining strip, an abutment engaging plate mounted transversely within the frame and slidable on the side members thereof, bearings provided centrally of the abutment engaging plate and on the rearward end of the said frame, a screw threaded through the frame bearing and fixed rotatably in the plate bearing, and a handle on the outer end of the screw whereby it may be rotated to adjust the frame with respect to the abutment engaging plate.

3. A device of the character described comprising an open rectangular frame having an internally threaded bearing at one end and a beveled face at its opposite end, a toothed plate secured to the beveled face, an abutment plate mounted within the said frame and adapted to slidably support the latter and having a smooth bearing thereon alined with the first named bearing, a screw mounted in the internally threaded bearing and having a reduced inner end rotatably seated in the said smooth bearing, a pin extended through the said reduced end to hold the same within its bearing and a handle on the outer end of the screw.

Signed at Seattle, King County, Washington, this 26th day of June, 1923.

CLAUDE FRIZZELL.